2 Sheets—Sheet 1.
J. N. BOLLES.
APPARATUS FOR BORING ARTESIAN WELLS.
No. 17,064. Patented Apr. 14, 1857.
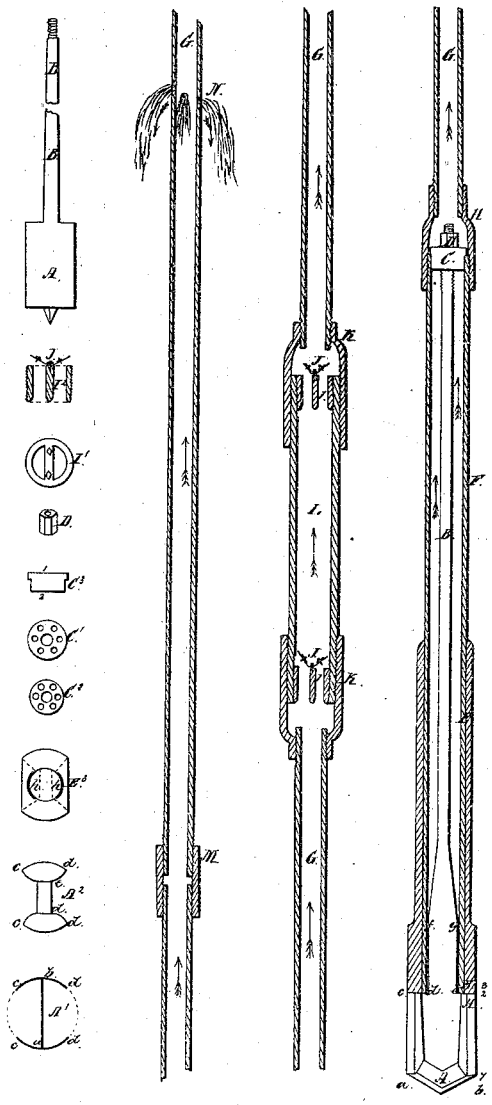
Witnesses:
Inventor:

J. N. BOLLES.
APPARATUS FOR BORING ARTESIAN WELLS.
No. 17,064. Patented Apr. 14, 1857.
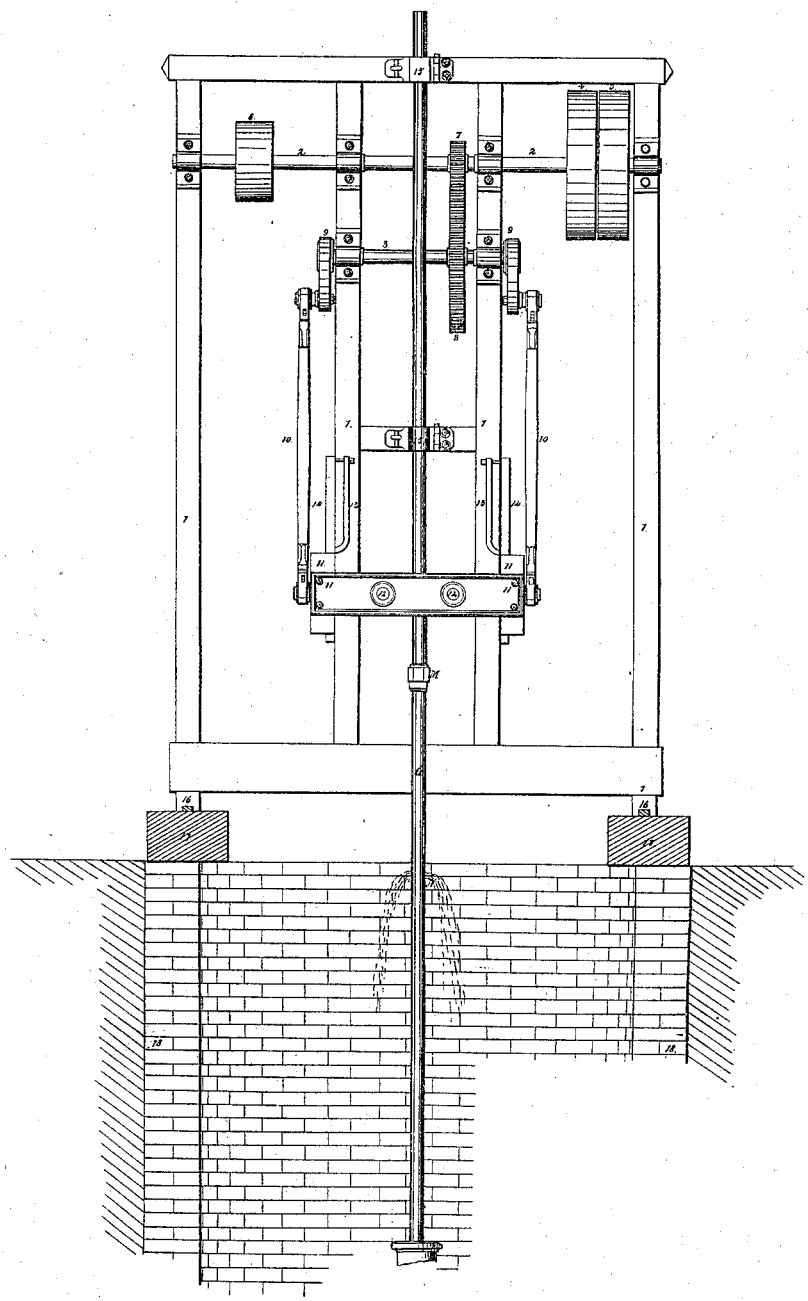

UNITED STATES PATENT OFFICE.

JESSE N. BOLLES, OF PHILADELPHIA, PENNSYLVANIA, ASSIGNOR TO M. W. BOLLES.

APPARATUS FOR BORING ARTESIAN WELLS.

Specification forming part of Letters Patent No. 17,064, dated April 14, 1857; Reissued December 20, 1864, No. 1,837.

*To all whom it may concern:*

Be it known that I, JESSE NORRIS BOLLES, of Philadelphia, in the State of Pennsylvania, have invented a new and Improved Apparatus for Drilling Rocks for Artesian Wells and for other Purposes; and I do hereby declare that the following is a full and exact description thereof, reference being had to the accompanying drawings and the letters of reference marked thereon.

The nature of my invention consists in the use of cylindrical drilling rods, in connection with a series of valves and peculiarly constructed cutters, or drills, by which the detritus is discharged at the surface of the earth, however deep the drill may be down, thereby obviating the necessity of frequently raising the rods for the purpose of cleaning the bore, and greatly diminishing the cost of perforating the harder crusts of the earth.

To enable others skilled in the art to make and use my invention I will proceed to describe its construction and operation.

I construct my apparatus by making a steel cutter see Figure 1, letters A and B (drawing No. 2) say 4 inches from $a$ to $b$ and $5\frac{1}{2}$ inches from $a$ to $c$ the point projecting $\frac{1}{2}$ an inch at the center, which will make an imprint as shown in Fig. 4. $A^1$ $a$ to $b$ which is its sharpened edge, the segment Fig. 4. $A^1$ $c$, $d$, keeping the bore perfectly round. The cutter is finished by placing it in a lathe, (before the hardening process) and turning it on the outside Fig. 1. $a$, $c$, 1, 2, and Fig. 4. $c$, $d$, and facing it, as at Fig. 1. $c$, $d$, $e$, 2 and turning the shank at its edges as at $d$, $f$, $e$, $g$, to fit the bore of the drill stock, which is two inches for four or five inches up. This portion of the drill or cutter is 2 inches wide and $\frac{3}{4}$ inch thick to near the point or cutting edge where it is beveled more or less, as required. At $f$, $g$, Fig. 1 the steel cutter is then welded to a $\frac{3}{4}$ inch round iron rod, tapering to $\frac{5}{8}$ at the top upon which a good thread is cut, passing through the central hole of the brass washer C, Fig. 1, where the nut D brings it to a snug shoulder with the lower end of the drill stock E, F, Fig. 1, which is made in part of an extra heavy wrought iron gas pipe three or four feet long and in part by cast iron shrunk upon the lower end of the gas pipe about twenty inches up, the first four inches being 4 inches diameter on two sides while the other two sides are flattened to about three inches as shown at Fig. 4, $E^3$, which represents the faced end of drill stock, the dotted lines showing the fitting of the drill and the letters $h$, $h$, the apertures through which the water and detritus ascends to the surface as indicated by the arrows.

The lower end of the drill stock is bored out two inches diameter four or five inches up, into which bore the shank of the cutter fits with nicety, while upon the outside of the upper end of the same, (which is wrought iron) a heavy thread is cut, upon which a wrought, or maleable iron reducing socket is placed Fig. 1 letter H connecting it with an $1\frac{1}{2}$ inch gas pipe (extra heavy) which size rods constitute the main drilling rods, and are of convenient lengths of from five to fourteen feet in length. These sockets or couplings, as well as the rods, should be placed in a lathe, so as to cut the threads on a perfectly straight line with each other. The taps and dies should be slightly tapering, so as to have the connecting rods drawing, the rods should not be allowed to butt together and the joints should be made with nicety and precision.

A short distance above the drill stock should be placed the pump Fig. 2 L which is made of $2\frac{1}{2}$ inch extra heavy wrought iron gas pipe about 18 inches long, upon each end of which should be cut on the outside a heavy thread for the reducing coupling K and on the inside a finer thread for one and one-half inches into which the brass valve seat I is to be screwed, with the leather valves J see also Fig. 4, I and J, upward into each end, the reducing sockets K connecting the pump to the main drilling rods which are made of wrought iron gas pipe, extra heavy, $1\frac{1}{2}$ inches diameter, Figs. 1, 2, 3, letter G which are connected by wrought iron sockets or couplings 4 inches long $\frac{1}{4}$ inch thick at least, Fig. 3. M, tapped slightly tapering so as to bring the rods, nearly, together, when new, and as the threads wear by use and before the ends butt or meet together they should be shortened so as to keep all the screw joints perfectly tight, the drill while at work being turned in the same direction prevents them from working loose. The various parts will then form a continuous cylindrical drilling rod and should always be perfectly straight or on a line.

To operate this apparatus effectively it should be attached to Bolles and Knights rock drilling machine patented May 1849 which raises it about six inches each stroke and about sixty times per minute, discharging all the detritus from the bottom of the bore as fast as made by the drill or cutter, through the holes in the upper rod at the surface of the ground see Fig. 3, letter N, whereby the operator can determine how often to withdraw the drill, to sharpen the cutters, &c., judging by the specimens thus discharged.

On applying power to pulley 4 (drawing No. 1) the cranks 9 elevate the cross head 11 when the jaws therein grasp the drill rod G, together with one or more set of valves or pumps L Fig. 2 (see drawing No. 2) and the drill stock F, and cutter A, Fig. 1, and raises them, all in connection, about 6 inches, or any other required height, when the trips 13 (drawing No. 1) opens the jaws, inside the cross head 11, thereby letting the cutter at the bottom strike the rock, with any desired force and on its again raising the apparatus, the valves J close and bring up the detritus, which by its continued operation causes an upward current of water carrying with it all the cuttings and discharging them through the apertures N in the upper rod G into the pit 18.

I am aware that short cylinders, with cutters and valves attached, have been used for the purpose of drilling rocks at great depths operated by ropes or chains, and that hollow rods have been used in Europe in connection with a powerful force pump, through which a current of water is forced downward, causing the detritus to overflow at the surface of the earth, at the annular space between the drill rod and the sides of the drill hole, but I am not aware that either have ever been used in the manner as described herein.

What I claim as my invention, and desire to secure by Letters Patent, is—

The combination of cylindrical boring rods, with cutters and valves so constructed as to discharge the detritus upon the surface of the ground at every stroke of the drill, as herein described, or any other mode substantially the same, which will produce the same effect.

JOHN NORRIS BOLLES.

Witnesses:
   M. W. MEANS,
   GEO. W. CAMPBELL.

[FIRST PRINTED 1912.]